(12) United States Patent
Hanna

(10) Patent No.: US 6,834,917 B2
(45) Date of Patent: Dec. 28, 2004

(54) SELF-DISCHARGING FREIGHT CONTAINER FOR BULK SOLIDS

(76) Inventor: John William Hanna, 35 Glenariff Street, Ferny Grove, Queensland (AU), 4055

( * ) Notice: Subject to any disclaimer, the term of this patent is extended or adjusted under 35 U.S.C. 154(b) by 0 days.

(21) Appl. No.: 10/149,704

(22) PCT Filed: Dec. 18, 2000

(86) PCT No.: PCT/AU00/01555

§ 371 (c)(1),
(2), (4) Date: Jun. 14, 2002

(87) PCT Pub. No.: WO01/44079

PCT Pub. Date: Jun. 21, 2001

(65) Prior Publication Data

US 2002/0190566 A1 Dec. 19, 2002

(30) Foreign Application Priority Data

| Dec. 17, 1999 | (AU) | ............................................... PQ5690 |
| Jan. 4, 2000 | (AU) | ............................................... PQ5588 |
| Feb. 3, 2000 | (AU) | ............................................... PQ5398 |

(51) Int. Cl.⁷ ................................................ B60P 1/16
(52) U.S. Cl. ........................... 298/1 A; 298/1 V; 298/7; 298/8 R; 298/18; 298/22 P; 298/25; 298/1 B
(58) Field of Search ................................. 298/1 A, 1 B, 298/1 V, 7, 8 R, 17.6, 18, 25.27, 22 R, 22 P

(56) References Cited

U.S. PATENT DOCUMENTS

| 2,929,658 | A | * | 3/1960 | Killebrew .................... 298/8 R |
| 3,753,593 | A | | 8/1973 | Wells et al. ................... 298/10 |
| 3,964,791 | A | * | 6/1976 | Griffis ......................... 298/11 |
| 4,327,945 | A | * | 5/1982 | Fowler ........................ 298/11 |
| 5,588,711 | A | * | 12/1996 | Hall ............................ 298/18 |
| 6,113,194 | A | * | 9/2000 | Neufeld ..................... 298/17.7 |
| 6,179,385 | B1 | * | 1/2001 | Rogers ........................ 298/18 |
| 6,439,668 | B1 | * | 8/2002 | Hagenbuch et al. .......... 298/18 |
| 6,626,498 | B1 | * | 9/2003 | Ostermeyer ................... 298/18 |

FOREIGN PATENT DOCUMENTS

| DE | 298 05 854 | 6/1999 |
| GB | 1 511 550 | 5/1978 |
| GB | 2 316 055 | 2/1998 |
| WO | 84/02118 | 6/1984 |
| WO | 96/07605 | 3/1996 |

* cited by examiner

Primary Examiner—Stephen Gordon
(74) Attorney, Agent, or Firm—Young & Thompson

(57) ABSTRACT

A self-discharging freight container for bulk solids of the type which discharge by tilting to that a hinged wall and a floor become coplanar, as a container braced by a pair of triangulating braces adjacent the hinge. Rams extending from the static frame push against the braces and rotate the container by 40°. Side-by-side and end-to-end versions tip to the left and right. A crane lifted version is included.

21 Claims, 10 Drawing Sheets

SELF-DISCHARGING FREIGHT CONTAINER FOR BULK SOLIDS

FIELD OF INVENTION

By "Freight containers" we mean ISO standard freight transport containers but clearly the invention can be adapted to suit any standard container size. These are routinely transported by road, rail or ocean freight. The purpose of the container is to transport and discharge any bulk solid irrespective of the bulk density of the material or its flow characteristics.

SUMMARY OF THE INVENTION

The apparatus aspect of the invention provides a self-discharging freight container for bulk solids comprising:

a static frame capable of supporting the container and contents;

a container hinged to the frame along a tilting axis at or near the top of the frame;

the container having a hinged floor which tilts to release the contents when the container is tilted toward a discharge position;

wherein, the container has a pair of mutually spaced, triangular braces adjacent the hinge axis; and a thrust point along each brace and a reaction point on an adjacent part of the static frame between which points a discharging force is exertable.

Preferably the braces extend into the container interior. They may be located symmetrically along the length of the container and mutually separated by half the length of the container. The force may be exerted by rams each of which works in a pocket provided in the container interior. The brace may be reinforced by a strut extending from the hinge axis and the thrust point is at the intersection of the brace and the strut.

A flow control surface is located at each end of the floor externally of the container to direct exit flow. The flow control surface may be a plate extending uprightly from the floor, the length of the plate being equal to the floor width. The flow control surface may contact a seal surface on the adjacent end wall of the container. This may be a flexible seal strip which lines the junction between the container walls and the floor in order to arrest particles. The floor itself may be faced with a hard wearing polymer suitable for bulk solids handling with a useful coefficient of friction. A floor vibrator such as an eccentric weight device may assist solids flow.

If multiple rams are used, say every 2.5–3 m along the length of the container, then rams used in the construction of agricultural machinery may be used. Hydraulic tilting of the container is convenient but in an alternative version the container has a lifting point on the side of the container opposite to the hinge axis so the container may tilted by external means. This permits discharge by an overhead crane. In this instance the rams remain connected and damp the initial discharge movement which would otherwise be too sudden.

DESCRIPTION OF THE DRAWINGS

In order that the present invention can be clearly understood and put into practical effect the description will now refer to the drawings which are diagrammatic and not to scale, the drawings show non-limiting embodiments of the invention, wherein.

DESCRIPTION OF PREFERRED EMBODIMENTS

Figure 1:
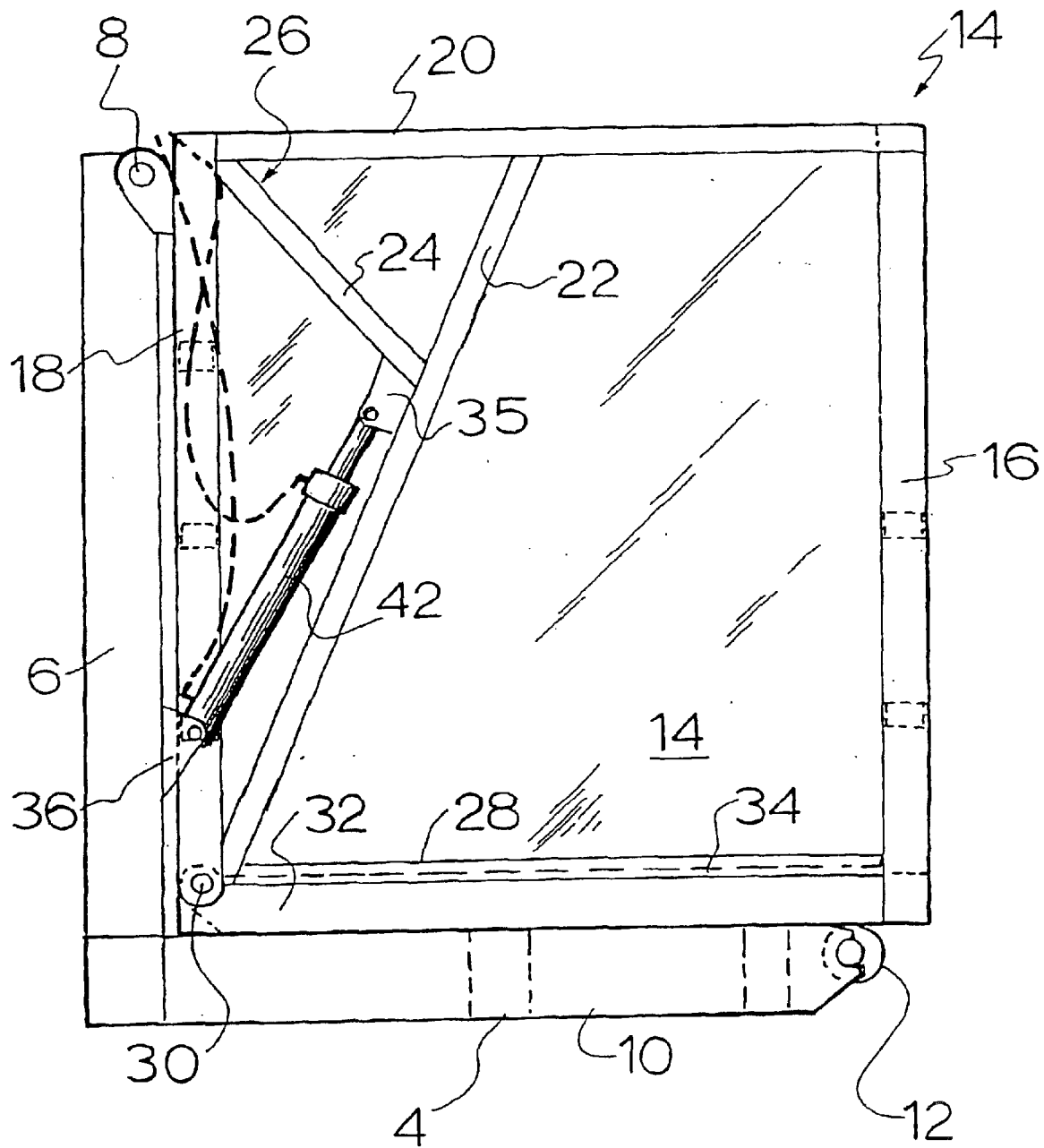
FIG. 1 is a sectional elevation at A (See FIG. 2) of the unmounted freight container showing the hydraulic ram.

Referring now to the drawings, the freight container is shown unmounted but in use will be mounted on a rail wagon, a truck used by a port authority or the like. The container itself is top-filled from bulk feeder installations but for grains carriage, the container will have a roof or a tarpaulin cover.

Figure 2:
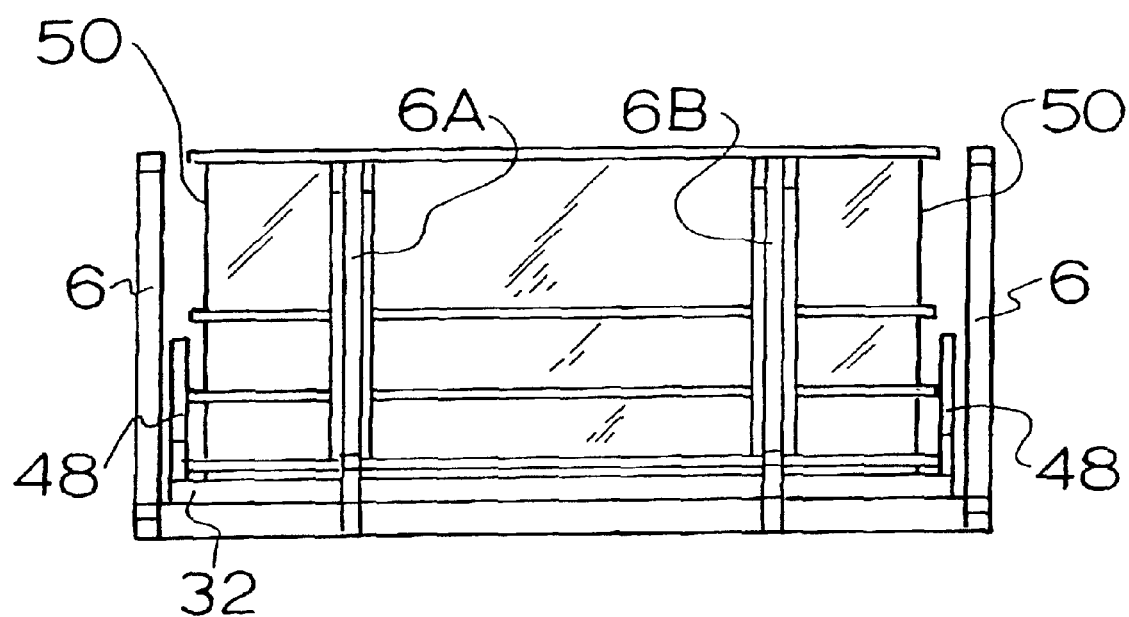
FIG. 2 is a rear elevation of FIG. 1 showing the static frame and the container frame.
Figure 3:
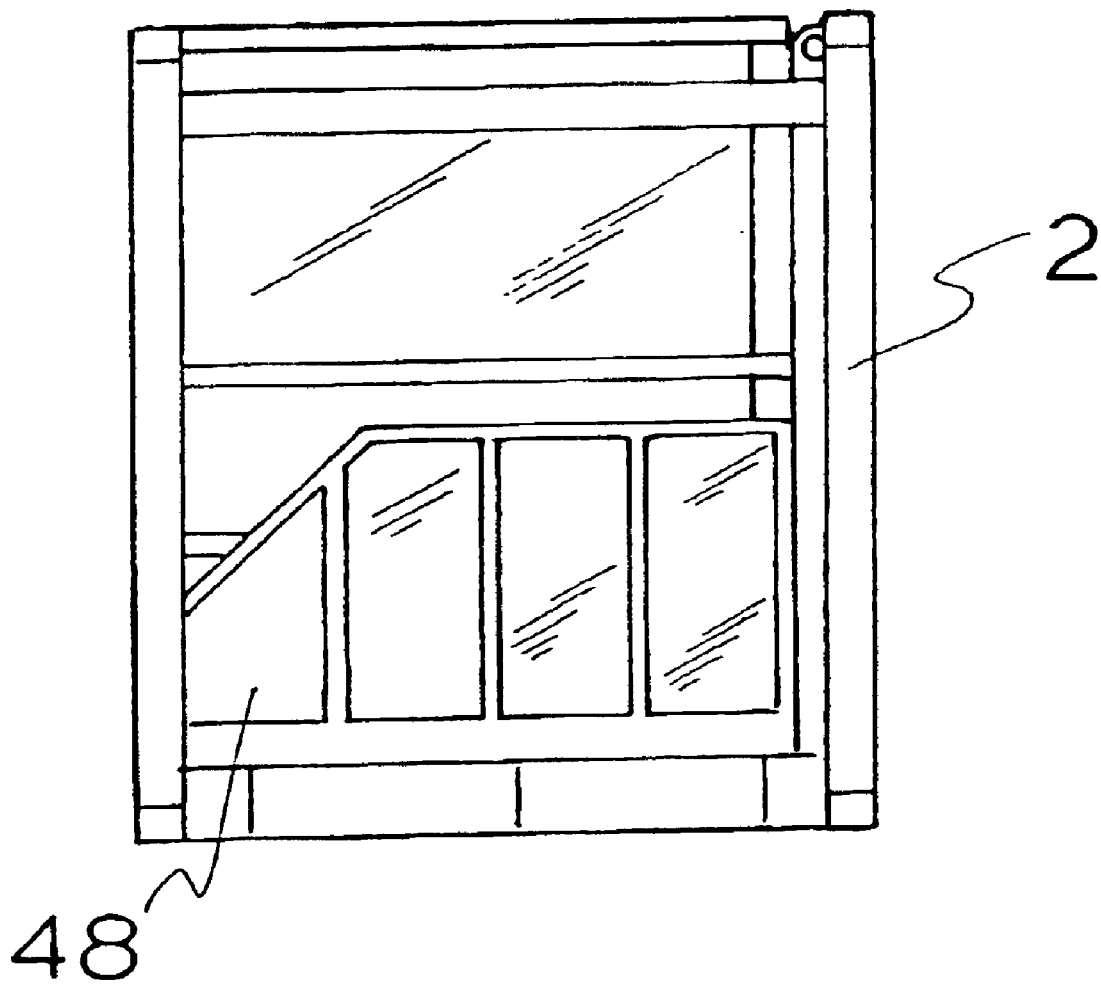
FIG. 3 is an end elevation of FIG. 1.

Referring to FIGS. 1–3, the static frame is made of rectangular box-section end frames 2, joined by ground-engaging bearers 4. A pair or intermediate L-shaped vertical legs 6, support half the container hinge 8. The horizontal legs 10 have floor rolls 12. The container 14 is a box having a cage 16 composed of box-section ribs 18 and connecting rails 20. The top rail 20 is connected to rib 18 by brace 22. Strut 24 extends between hinge corner 26 and brace 22. Bottom rail 28 is like the top rail 20 and defines the floor opening. Ribs 18 located half of a floor hinge 30. The remaining half is fixed to the floor frame 32. The cage is lined with steel plate creating an open topped box. The floor frame 32 is covered with a slab of high density polyethylene. The floor perimeter carries a continuous, quadrant section rubber seal 34.

Figure 4:
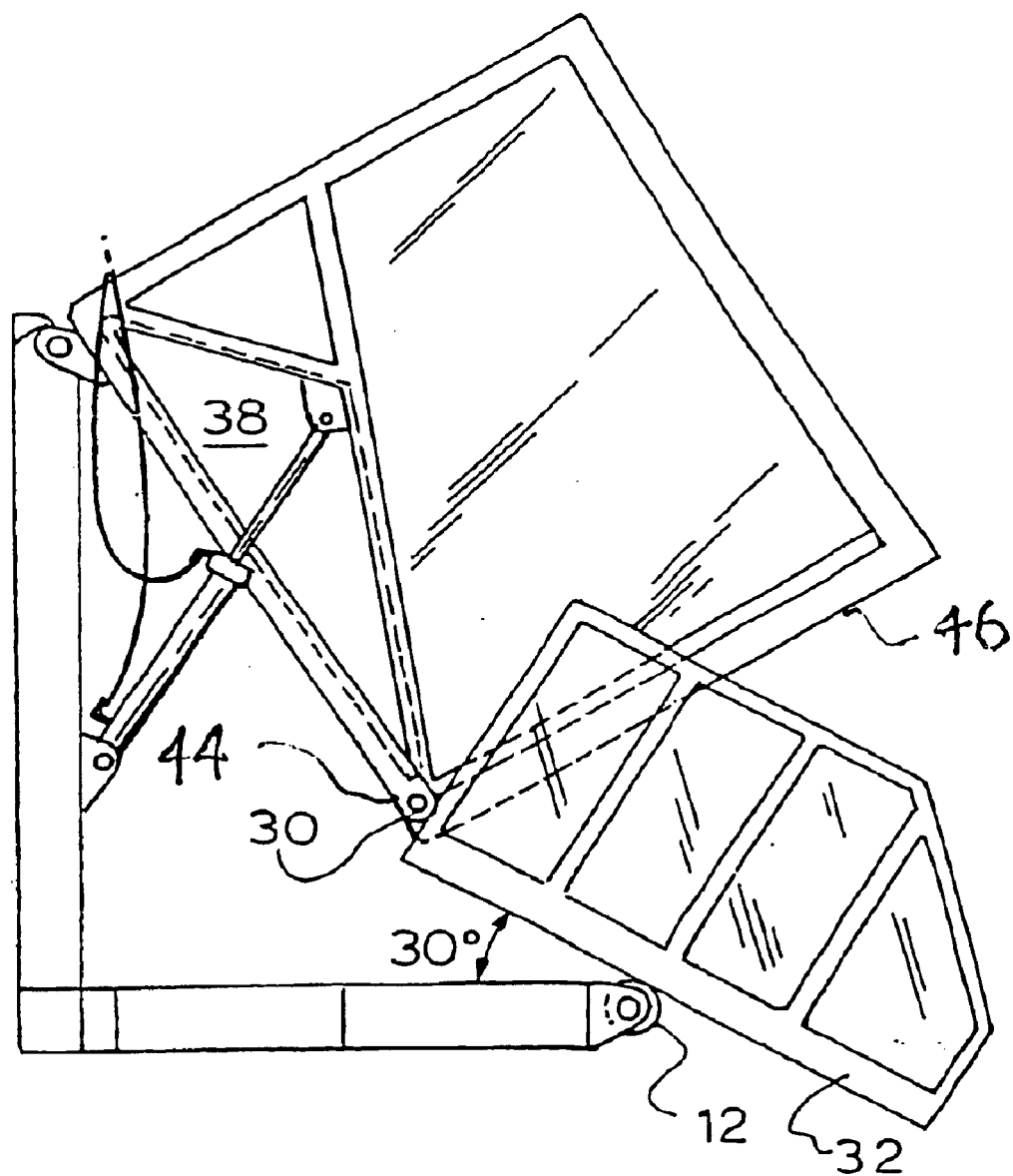
FIG. 4 is a side elevation similar to FIG. 1 but showing an intermediate discharge position.
Figure 5:
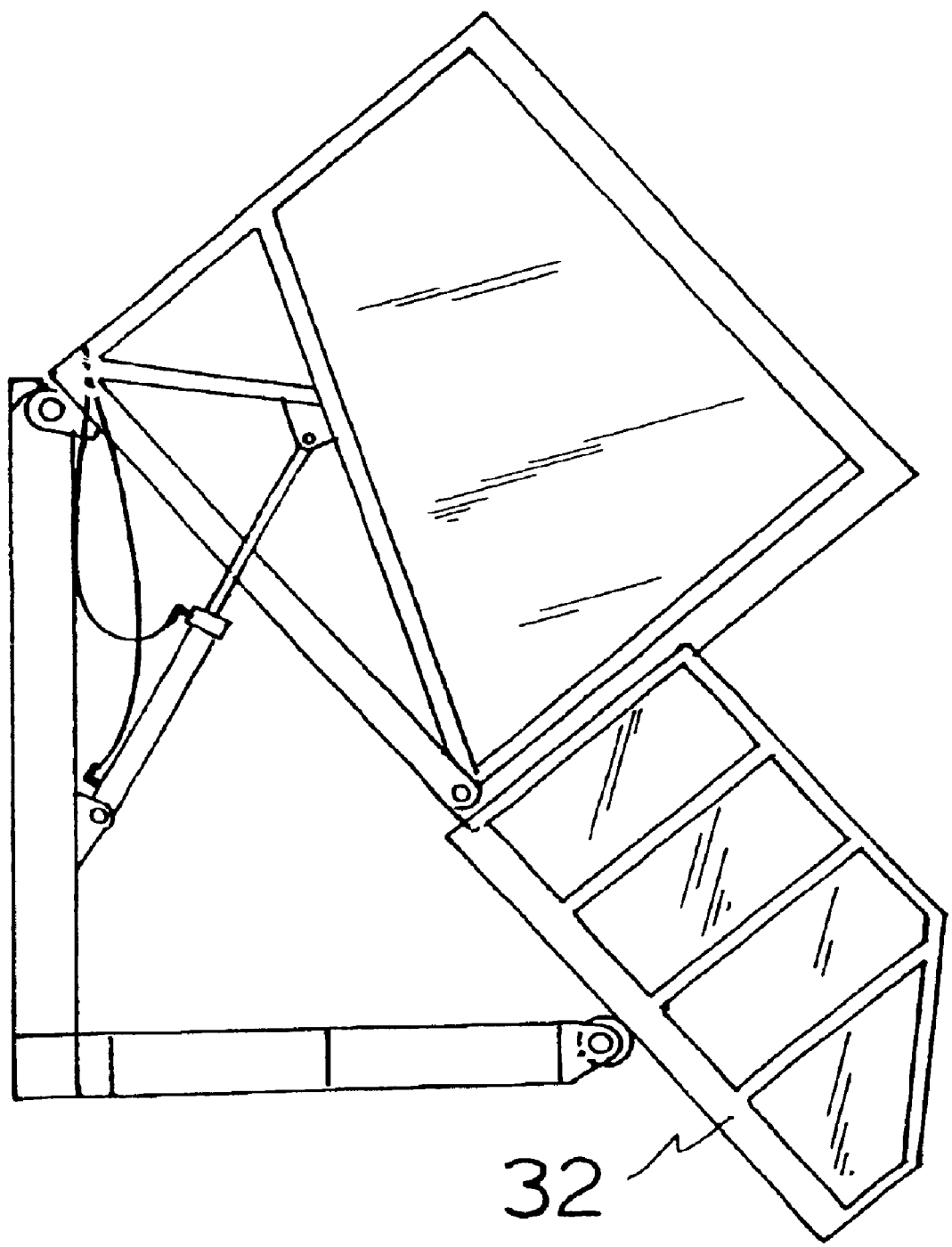
FIG. 5 is a side elevation similar to FIG. 4 showing the final discharge position.

The hinge corner 26 of the container frame mounts the remaining half of the container hinge 30. Thrust mounts 35, 36 allow double acting ram 42 to tilt the container about the longitudinal tipping axis to the position shown in FIG. 4 and finally to the position shown in FIG. 5.

FIG. 2 shows the intermediate legs 6A, 6B. The braces 22 lie in the interior of the container and the rams work in hollow pockets 38 indicated by broken lines in FIG. 4. Placing the rams at ¼ positions shown in FIG. 2 minimises deflections.

Figure 9:
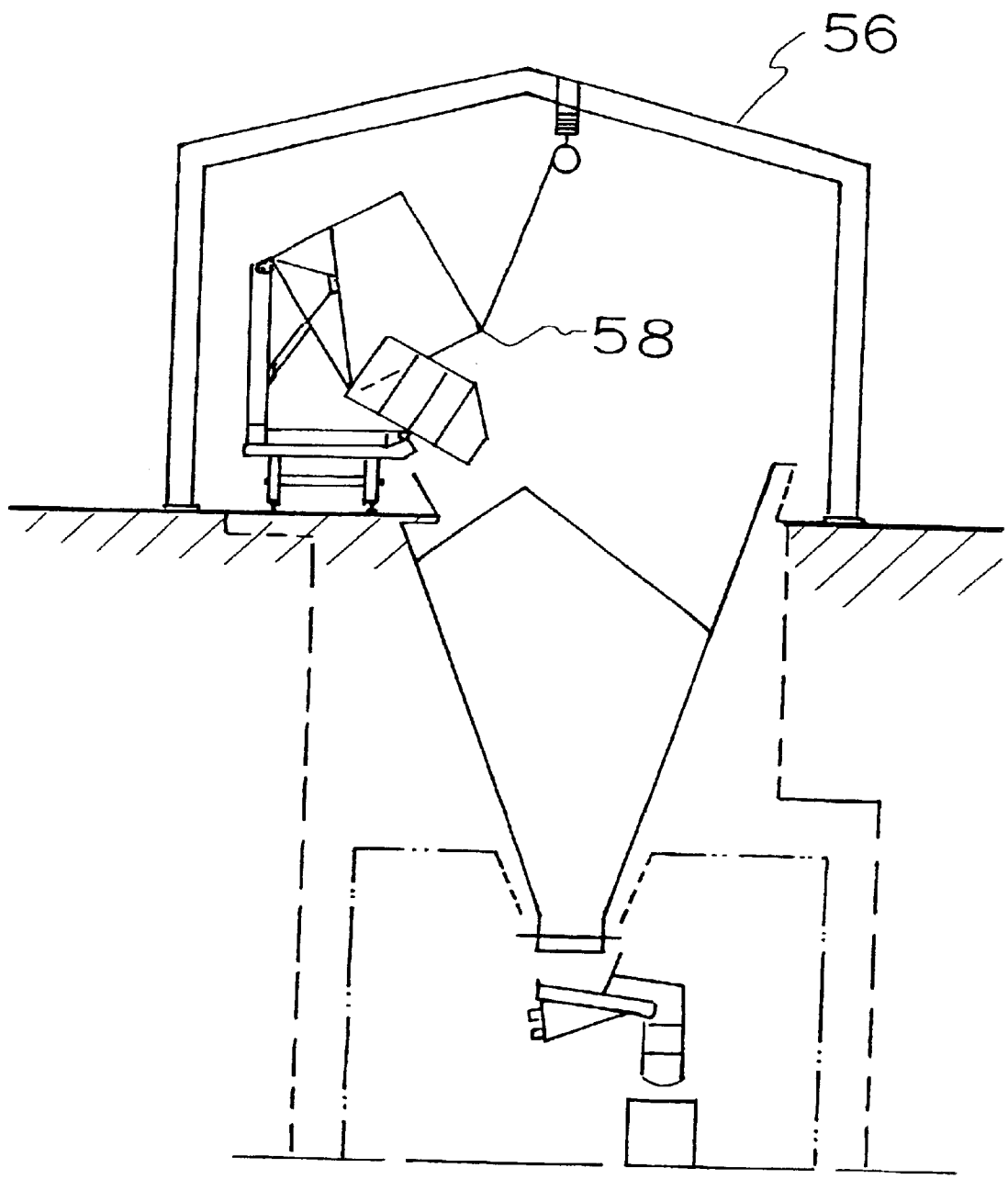
FIG. 9 is a side elevation of a version which is discharged by a crane.

The freight container weights about 4.5 tonnes and the load is of the order of 25 tonnes. It is designed to discharge loads into existing bulk handling installations which have chutes, hoppers, elevators and known ancillary equipment as indicated in FIG. 9.

When discharge commences the displacement force is large because the entire contents are supported by the floor. The brace distributes the discharge thrust through the cage. The brace acts at the floor hinge corner 44, simultaneously lifting and tilting the floor and separating wall 46 from the floor. As the discharge angle increases the floor rolls on the floor rolls 12. The opening width increases as the floor tilt steepens and orderly discharge follows.

Figure 6:
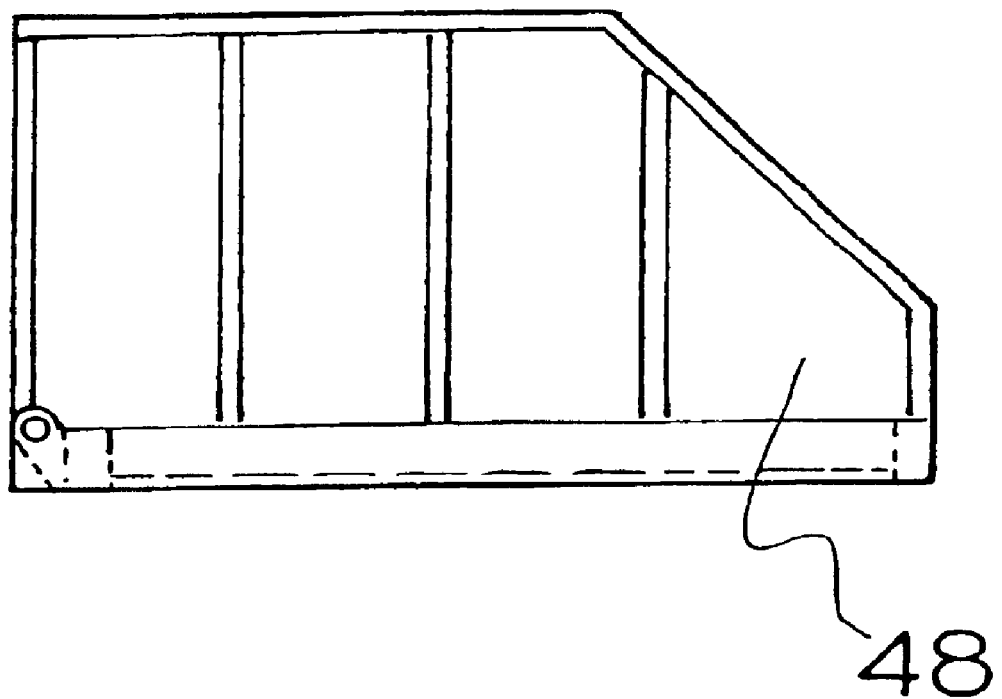
FIG. 6 is an elevation of a flow control plate.
Figure 7:
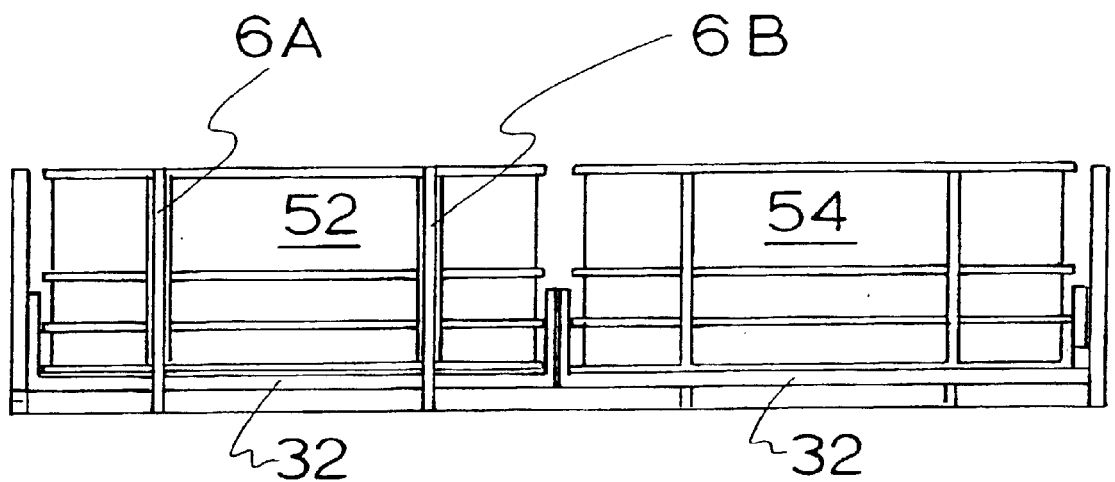
FIG. 7 is a rear elevation of a version capable of discharging to both left and right.
Figure 8:
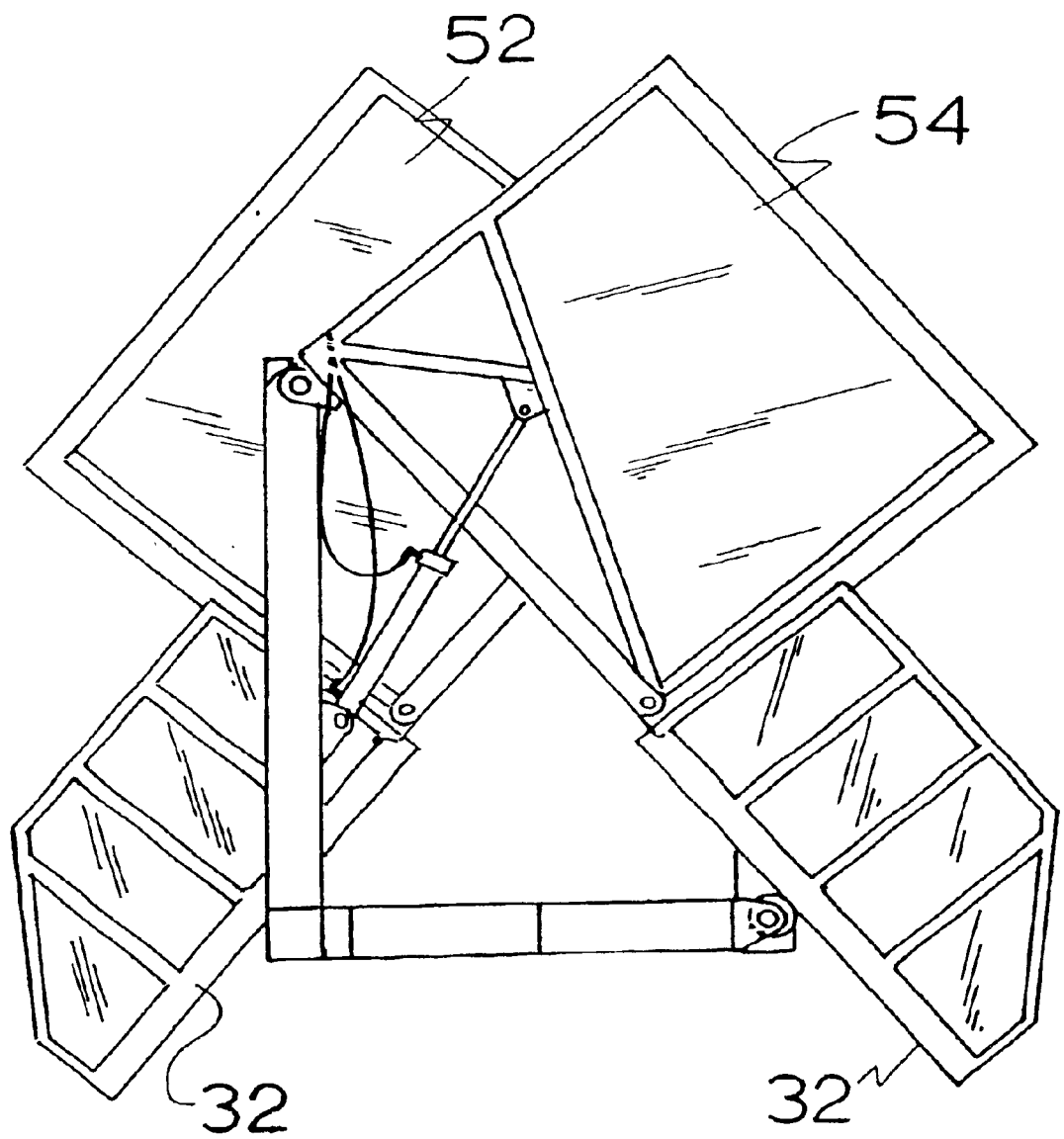
FIG. 8 is an elevation showing the final discharge position of the version of FIG. 7.

For loads which settle or lock or become sticky, an out of balance vibrator attached to the underside of the floor is actuated. As the contents flow from the slot defined by the walls of the container and the floor, they tend to diverge. Sideways divergence is prevented by the operation of flow control plates 48 which are upstance extending from the floor and consequently follow the movement of the floor. They lie just outside of the end walls 50 and ensure that the flow does not spread unduly in a horizontal direction (see FIG. 6). In FIGS. 7 and 8, the static frame is modified by the provision of a LH set of vertical legs 6A, 6B and a RH set of vertical legs (not shown) enabling an elongated static frame to accommodate a left-discharging cage 52 and a right-discharging cage 54. The disposition of the parts in the fully discharged position is shown in FIG. 8. Hydraulic power is provided by a diesel powered pump unit housed on part of the static frame.

In other versions the rams are coupled to the bulk-handling installation hydraulic circuit.

In FIG. 9 the hydraulics are replaced by a gantry crane 56 which hoists at twin lifting points 58 at the level of the door roller. The points correspond to the ram positions and thereby minimise deflection. The points are engaged with a bridging sling.

The hoist tilts the floor until the mass leaving and the mass remaining exert an over-centre action on the floor when the discharge accelerates suddenly. To slow the discharge, the ram acts as a hydraulic damper between the container and the static frame.

Figure 10:
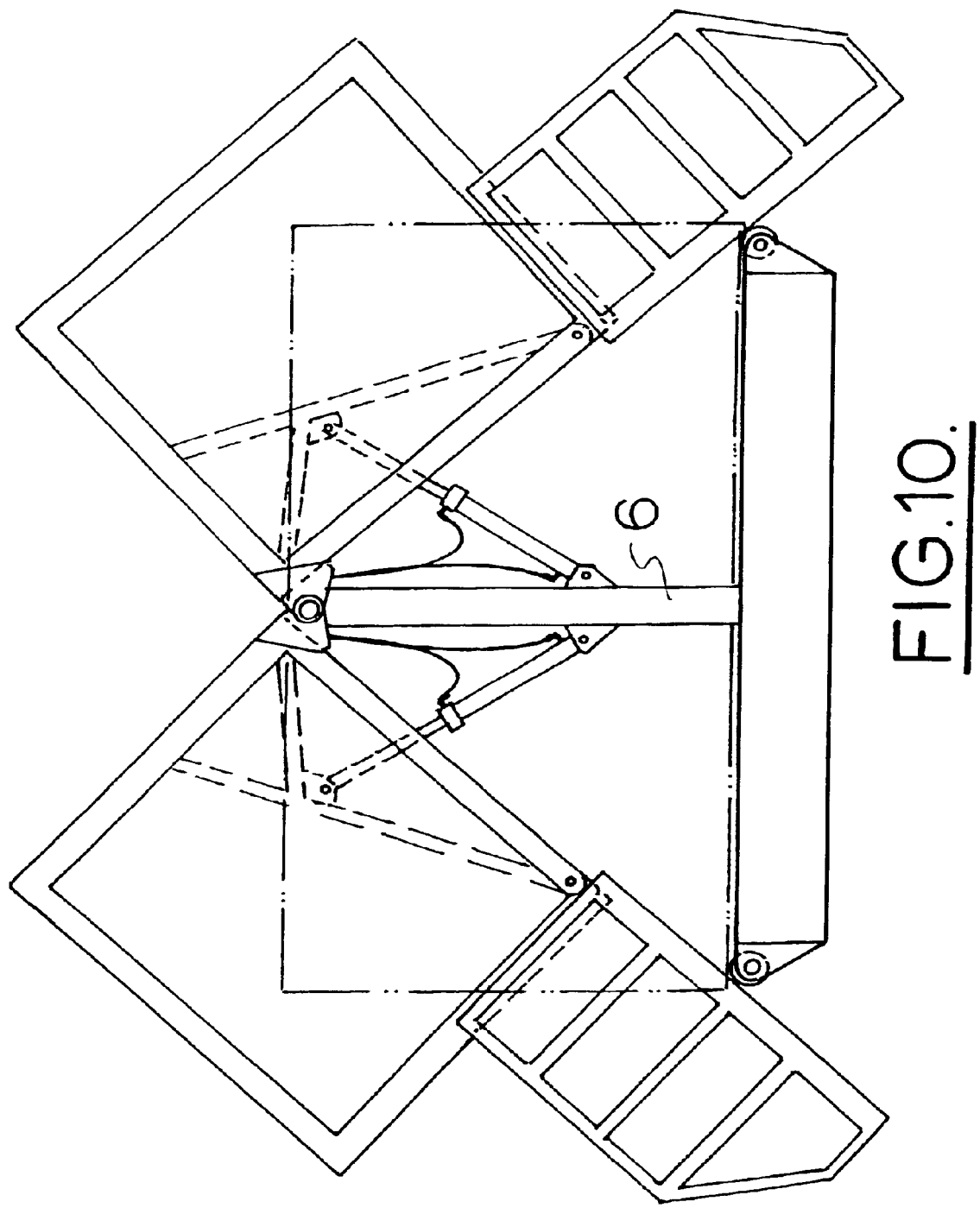
FIG. 10 is an end elevation of a version with side-by-side containers.

In FIG. 10 the vertical leg 6 moves from one edge of the static frame to the centre, giving the frame an inverted T-section. This allows the containers to lie in a pair, side-by-side with a common hinge axis. This embodiment is expected to be useful where very dense concentrates are carried. Usually the container will be of lesser volume than an ISO version.

In all embodiments, the floor rolls over the floor rollers to assume a position in which the hinged wall and the floor are coplanar at 50° to the horizontal. The container rotates through an angle of 40°. Fluent loads empty well before the final discharge position is reached so it is not essential that discharge extends to the 50° position for all loads.

We have found the advantages of the above embodiments to be:-
1. stiffer construction minimises material but preserves the robustness of the construction;
2. minimisation of tare weight.

Whilst the above has been given by way of illustrative example of the present invention many variations and modifications thereto will be apparent to those skilled in the art without departing from the broad ambit and scope of the invention as herein set out in the appended claims.

What is claimed is:

1. A self-discharging freight container for bulk solids comprising:
   a static frame capable of supporting the container and contents,
   a container hinged to the frame along a tilting axis at or near the top of the frame,
   the container having a hinged floor which tilts to release the contents of the container when the container is tilted toward a discharge position, wherein the container and floor have overlapping side walls.

2. A self discharging freight container according to claim 1 wherein the container has a pair of mutually spaced, triangular braces adjacent a hinge axis, a thrust point along each brace and a reaction point on an adjacent part of the static frame between which points a discharging force is exertable.

3. A self-discharging freight container as claimed in claim 2 wherein the braces extend into the container interior.

4. A self-discharging freight container as claimed in claim 3 wherein the braces are located symmetrically along the length of the container and mutually separated by half the length of the container.

5. A self-discharging freight container as claimed in claim 3 wherein the force is exerted by rams, each of said rams working in a pocket provided in the container interior.

6. A self-discharging freight container as claimed in claim 2 wherein each brace is reinforced by a strut extending from the hinge axis and the thrust point is at an intersection of the brace and the strut.

7. A self-discharging freight container as claimed in claim 2 wherein the overlapping side walls of the floor comprise a flow control surface located at each end of the floor externally of the container to direct exit flow.

8. A self-discharging freight container as claimed in claim 7 wherein the flow control surface is a plate extending uprightly from the floor, the length of the plate being equal to the floor width.

9. A self-discharging freight container as claimed in claim 8 wherein the flow control surface contacts a seal surface on an adjacent end wall of the container.

10. A self-discharging freight container as claimed in claim 2 wherein the container rotates through 35° to 45° to maximum discharge.

11. A self-discharging freight container as claimed in claim 2 wherein a flexible seal strip lines the junction between the container walls and the floor to arrest particles.

12. A self-discharging freight container as claimed claim 2 wherein the floor is faced with a hard wearing polymer suitable for bulk solids handling and having useful coefficient of friction.

13. A self-discharging freight container as claimed in claim 2 wherein the floor has vibrating means to assist solids flow.

14. A self-discharging freight container as claimed in claim 2 wherein the container has a roof which permits top filling.

15. A self-discharging freight container as claimed in claim 2 wherein the static frame additionally accommodates a second container, one said container discharging to the left and another said container discharging to the right.

16. A self-discharging freight container as claimed in claim 1 further including a second container, wherein the two containers are located one behind the other in a direction of carriage.

17. A self-discharging freight container as claimed in claim 3 wherein multiple interior rams exert a discharge force every 2.5–3 m along the length of the container.

18. A self-discharging freight container for bulk solids according to claim 1 wherein a pair of lifting points are located symmetrically along the side of the container and mutually separated by half the length of the container.

19. An apparatus fitted with a self-discharging freight container as claimed in claim 1.

20. A rail wagon fitted with a self-discharging freight container as claimed in claim 1.

21. A self-discharging freight container as claimed in claim 15 wherein the static frame has a central support and the two containers lie side-by-side, separated by the central support.

* * * * *